W. WINKELMANN.
SAFETY RECEPTACLE.
APPLICATION FILED JULY 13, 1910.
1,033,647.
Patented July 23, 1912.
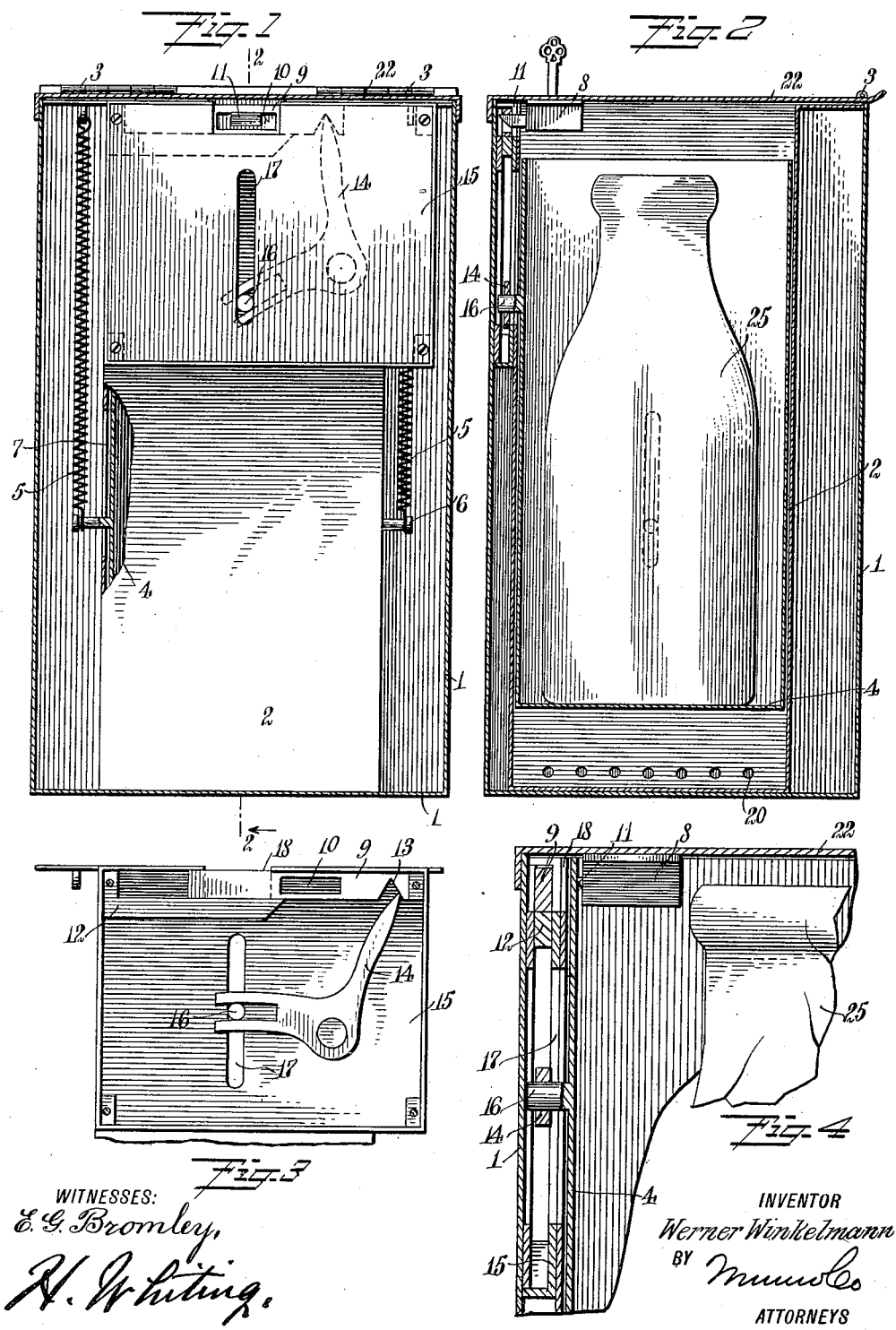
WITNESSES:
E. G. Bromley,
H. Whiting.
INVENTOR
Werner Winkelmann
BY Munn & Co.
ATTORNEYS

UNITED STATES PATENT OFFICE.

WERNER WINKELMANN, OF NEW YORK, N. Y.

SAFETY-RECEPTACLE.

1,033,647.

Specification of Letters Patent. Patented July 23, 1912.

Application filed July 13, 1910. Serial No. 571,807.

*To all whom it may concern:*

Be it known that I, WERNER WINKELMANN, a citizen of the United States, and a resident of the city of New York, borough of Brooklyn, in the county of Kings and State of New York, have invented a new and Improved Safety-Receptacle, of which the following is a full, clear, and exact description.

This invention relates to a receptacle in which may be deposited bottles containing milk or other merchandise, so as to prevent the same from being tampered with by unscrupulous persons when the vender leaves them outside of the buildings.

An object of this invention is to provide a device which will be simple in construction, inexpensive to manufacture, strong, durable, simple in its operation, and perfectly secure.

A further object of this invention is to provide a receptacle which normally is maintained unlocked, but which may be automatically locked or placed in a receptive locking condition by the insertion therein of a full milk bottle or other merchandise.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a vertical section showing the lock plate in its locking position; Fig. 2 is a vertical section on the line 2—2 of Fig. 1, showing the receptacle locked; Fig. 3 is a fragmentary view showing the mechanism for controlling the locking plate, illustrating the lock plate in its non-locking position; and Fig. 4 is an enlarged fragmentary view similar to Fig. 2, showing the receptacle in its unlocked condition.

Referring more particularly to the separate parts of the device, 1 indicates an outer casing, which is provided with a cover 22, adjustably secured thereto in any well known manner, as by means of hinges 3. Within the casing 1 there may be provided an auxiliary casing 2, preferably spaced apart from the casing 1 a sufficient distance to form an air space, so that the material within the casing 2 may be kept cool in summer and be prevented from freezing in winter. This space between the casings 1 and 2 may, if desired, be filled with non-conducting material, or the casings themselves may be coated with asbestos, to prevent the change in temperature within the casing 2 due to the difference in temperature outside the casing 1.

Within the casing 2, there is provided a receptacle 4, which may be of any suitable character, and is adjustably mounted in the casing 2 so as to have its position varied by the weight of merchandise placed therein, such as a full milk bottle 25. The casing 2 may be provided, if necessary, at the lower end, with openings 20 to permit the exit of the air entrapped by the downward movement of the receptacle 4, so that the operation of the device will not be interfered with. The weight of the receptacle 4 may be counterbalanced to a greater or less extent by any suitable means, such as a counterbalancing weight, or, as illustrated, by means of springs 5, which are secured at one end to pins 6, secured to the receptacle 4 and projecting through slots 7 in the casing 2, and at their other ends to either the casing 2 or the casing 1.

The object of having the receptacle 4 movable and counterbalanced in the manner described, is so that it may render locking mechanism, comprising a spring lock 8 and a lock plate 9, operative or inoperative, according to whether the receptacle 4 is occupied by merchandise, such as a full milk bottle, or unoccupied.

For the purpose of controlling the locking mechanism, the lock plate 9 in this case is shown to be movable, so that its aperture may be moved into or out of coöperative relation with the spring latch 11 of the spring lock 8. In the form shown in the drawings, the lock plate 9 is shown as slidingly mounted on a guide 12 and provided with a cut-out portion 13, which is adapted to be engaged by an operating member in the form of a bell crank lever 14 pivoted to a lock casing 15, secured in any well known manner to the casing of the receptacle. The bell crank lever 14 is provided on that arm which does not engage the lock plate 9, with a bifurcated portion, the forks of which engage on opposite sides of a pin 16, which extends through a slot 17, and is secured to the movable receptacle 4, whereby the movements of the receptacle 4 are transmitted to the bell crank lever 14, and thus to the plate 9.

It will be seen that the lock plate 9 has a cut-out portion 18 at the point where the latch 11 is adapted to project across the lock plate.

The operation of the device will be readily understood when taken in connection with the above description. The receptacle 4 is so counterbalanced in this case by adjusting the tension of the springs 5, that it will be depressed by a full milk bottle, but will maintain its normal upper position when it carries only an empty milk bottle. It will thus be seen that a person can place the empty milk bottle in the receptacle 4 over night, and close the cover, but, inasmuch as the empty milk bottle is insufficient to depress the receptacle, the lock plate 9 will be in the position illustrated in Figs. 3 and 4, such that the latch 11 will not have a locking opening to engage with, so that the cover 22 will not be locked to the remainder of the receptacle as a whole. In this condition of affairs, it is not necessary that the milkman shall have a key, but he can merely raise the cover, remove the empty bottle, and place therein a full bottle. The weight of the full bottle, however, is sufficient to depress the receptacle 4, so that the lock plate 9 is moved from the position illustrated in Figs. 3 and 4 to the position illustrated in Figs. 1 and 2, where the latch 11 will slide into the opening 10 in this locking plate, and inasmuch as this latch 11 is operated by the automatic spring lock 8, it will secure the cover 22 closed onto the remainder of the receptacle 4, so that it can be opened only by utilizing a key, which the owner of the house is provided with.

It will thus be seen that milk or other merchandise can be delivered without disturbing the occupants of the house early in the morning, so that it will be secure from being tampered with by malicious and thieving parties.

Of course, it is to be understood that the dimensions of the receptacle 4 may be enlarged to accommodate more than one milk bottle, or, if desired, the receptacle 4 may be used merely as a key member for a compartment over which the cover 22 extends, which is sufficient to contain a plurality of milk bottles or a larger volume of merchandise.

While I have shown one embodiment of my invention, I do not wish to be limited to the specific details thereof, but desire to be protected in various changes, modifications and alterations which may come within the scope of the appended claims.

Having thus described my invention, I claim as new and desire to secure by Letters Patent:—

1. The combination with a casing, of a cover for said casing, a lock plate movably mounted on said casing and having an opening therein, said lock having a latch bolt adapted to engage said opening, said lock plate being adapted to shift into and out of coöperative relation with said latch bolt, a receptacle movably mounted in said casing, springs for counterbalancing said receptacle, a pin on said receptacle, and a bell crank lever pivotally mounted in said casing and having a bifurcated portion engaging said pin, whereby said bell crank lever is operated from said pin, said lock plate having a cut out portion adapted to be engaged by said bell crank lever, whereby said lock plate is slid back and forth by the movement of said receptacle.

2. The combination with a casing, of a cover for said casing, a lock plate slidingly mounted in said casing so as to move transversely thereof, said lock plate having an opening therein, a spring lock on said cover, having a latch bolt adapted to engage said opening in said lock plate, and means for maintaining said opening normally out of alinement with said latch bolt, adapted to be manipulated by the contents of said casing to bring said opening in said lock plate into alinement with said latch bolt by sliding said plate transversely of said casing.

In testimony whereof I have signed my name to this specification in the presence of two subscribing witnesses.

WERNER WINKELMANN.

Witnesses:
HORATIO WHITING,
PHILIP D. ROLLHAUS.

---

Copies of this patent may be obtained for five cents each, by addressing the "Commissioner of Patents, Washington, D. C."